United States Patent Office 2,835,925
Patented May 27, 1958

2,835,925

NYLON EXTRUSION

Donald D. Proctor, Seaford, Del., assignor to E. I. du Pont de Nemours and Company, Wilmington, Del., a corporation of Delaware No Drawing. Application May 10, 1955
Serial No. 507,471

3 Claims. (Cl. 18—55)

This invention relates to extrusion of nylon, particularly discontinuous or intermittent melt-extrusion of fiber-forming gel-susceptible polyamide without interference from gelled polymer.

Manufacture of fiber-forming polyamide by condensation polymerization of diamines and dibasic acids is taught by Carothers in Patent 2,190,770, while apparatus and methods for extruding those and other polymeric materials as self-supporting filaments are set forth by Greenewalt in Patent 2,217,743; Fields in 2,295,492; Johnson and Nydegger in 2,370,469; and by Waltz in Patent 2,571,975. In general, polymer in the form of solid chips or flakes is melted by heating and then is pumped or screw-extruded through orifices into filamentary form. The commercial success of polyhexamethylene adipamide as a component of synthetic fibers is well known. When molten, this polyamide made from adipic acid and hexamethylene diamine shares with other polymers similarly derived from adipic acid (and its amide-forming derivatives) an undesirable characteristic of gelling if allowed to stagnate. Although the mechanism of gelling is not well understood, it seems to involve cross-linking of individual molecules through interaction at the adipamide groups.

Gelling of molten polymer in the extrusion stream alters the viscosity, frequently produces deposits on heated surfaces of the equipment, and may actually clog the orifices; these occurrences are productive of abnormal physical properties in the extruded article. Although designed as a continuous operation, extrusion of filaments at best is intermittent because of necessity for occasional changing of spinnerets and cleaning, lubrication, or repair of various other elements of the extrusion equipment from time to time; adipamide remaining in the extrusion system during such intervals presents a considerable gelling hazard.

A primary object of the present invention is elimination of gelling in systems for extruding polymer susceptible to gel formation. Another object is improved removal of polyhexamethylene adipamide from an extrusion system to prevent gel formation upon discontinuing extrusion of the polymer. Other objects, together with means and methods for accomplishing the various objects, will be apparent from the following description of the invention.

In general, the objects of this invention are accomplished by flushing polymer susceptible to gel formation from an extrusion system by introducing in its stead polymer not so susceptible. This invention comprehends procedure of shutting down and subsequently starting up a system for extruding gel-susceptible polyamide by filling the system with compatible non-gelling polymer immediately before shutdown and reintroducing the gel-susceptible polymer after start-up. The invention is exemplified below using polycaproamide, which may be prepared by polymerization of 6-aminocaproic acid as described by Carothers in Example I of Patent 2,071,253. Ready availability of this material and its characteristic of forming an interpolymer with polyhexamethylene adipamide render it a particularly good choice for the purpose; however, many other non-gelling polymers may be employed instead, including not only many polyamides not derived from adipic acid (including particularly those formed by polymerization of amino acids or their amide-forming derivatives) but also polyesters, such as polyethylene terephthalate—to name only one of the best known.

Example

Over a period of several hours, commercial flake polyhexamethylene adipamide of 45 relative viscosity is fed into the hopper of clean apparatus of the Greenewalt type (mentioned above), melted, and extruded by pumping through a spinneret to form a multitude of self-supporting filaments. As the last of this flake passes from the hopper to the melter, the hopper is charged with flake polycaproamide prepared as indicated above, and the operating temperature of the melter is reduced from about 285° C. to about 265° C. After several minutes of continued extrusion, the spinning pumps are turned off and heating of the melter is discontinued, whereupon the polymer solidifies in the system. Upon subsequent start-up, the melter is heated and, after the polymer in the system melts, the pumps are turned on, whereupon extrusion of the polymer resumes. Again flake polyhexamethylene adipamide is supplied to the hopper, and soon the yarn being produced has throughout the characteristics of the nylon being produced by the system before the preparations for shutdown. No deposit is apparent in the elements of the equipment upon visual inspection during operation or after disassembly, although thorough cleaning of a like system in which no substitution was made for the polyhexamethylene adipamide during shutdown was required before extrusion could be resumed because of extensive gel deposits throughout the system.

Equally satisfactory results were obtained in following the procedure of the above example in shutting down and starting up a screw-melter-extruder system like that of Johnson and Nydegger, referred to above.

During cessation of extrusion activity, the temperature of the system may be maintained above room temperature or even above the melting temperature of the substitute polymer, but it should be below the temperature at which the substitute polymer starts to degrade, approximately 280° C. for polycaproamide, as suggested. The substitute polymer should be chosen not only for lack of gel susceptibility but also for compatibility with the polymer to be replaced—at least temporarily—by it and for not too dissimilar melting temperature. Under favorable conditions, as in the use of the stated polycaproamide as the substitute polymer, polymer gelling in the system often is reduced in amount or occasionally removed entirely, the substitute polymer acting to some extent as a flush for the system. A temperature as low as 250° C. may be employed satisfactorily in that operation. Other benefits and variations of the present invention will come readily to the mind of one skilled in the art without necessity for exercise of inventive faculties.

The claimed invention:

1. In operation of an extrusion system to extrude discontinuously molten polymer susceptible to forming a gel, the improvement comprising replacing the said gel-susceptible polymer in the system with polymer not susceptible to gelling before discontinuing operation of the system and maintaining the gel-in-susceptible polymer in the system during cessation of extrusion operations.

2. The process of claim 1 in which the polymer susceptible to forming a gel is polyhexamethylene adipamide and the polymer not susceptible to gelling is polycaproamide.

3. The process of claim 2 in which the extrusion system is cooled from temperature of about 285° C. to temperature within the range of 250° C. to 280° C. during the substitution of polymers.

References Cited in the file of this patent
UNITED STATES PATENTS 2,346,228     Merrill et al.  ---------- Apr. 11, 1944